March 1, 1960   B. M. GORDON   2,927,271
FREQUENCY METER
Filed Oct. 26, 1955

AT STEADY STATE
$$f = cf_0$$
$$c = \frac{f}{f_0} = Kf$$

AT STEADY STATE
$$f = cf_0$$
$$c = \frac{f}{f_0} = Kf$$

INVENTOR.
BERNARD M. GORDON
BY Jacob Trachtman
ATTORNEY

United States Patent Office 2,927,271
Patented Mar. 1, 1960

2,927,271
FREQUENCY METER

Bernard M. Gordon, Newton, Mass., assignor to Epsco, Incorporated, Boston, Mass., a corporation of Massachusetts Application October 26, 1955, Serial No. 542,875

10 Claims. (Cl. 324—78)

The invention relates to a frequency meter, and more particularly to a counting device of the servo type delivering an output signal in binary form proportional to the rate of sequentially received signals delivered to the device.

Heretofore, frequency measuring and counting devices have been of complex construction utilizing sampling techniques for delivering information at a later time. Such equipment besides being complex and expensive has not been able to deliver an output signal corresponding to the frequency of the signal to be measured during the time of its measurement. This has reduced the usefulness and efficiency of such equipment. In the case where information relating to the frequency of a train of signals is to be delivered in binary form, it has been necessary to utilize additional conversion equipment which has also increased the cost and reduced the efficiency of such apparatus.

It is therefore an object of the invention to provide a new and improved frequency meter which is simple, inexpensive and efficient in operation and construction.

Another object of the invention is to provide a new and improved frequency meter which continuously delivers an output signal reflecting the input frequency of signals received.

Another object of the invention is to provide a new and improved frequency meter which does not require special conversion apparatus for delivering its information signal in binary form.

Another object of the invention is to provide a new and improved frequency meter which can follow and measure changes in the frequency of the input signal.

Another object of the invention is to provide a new and improved frequency meter which may be adapted for quickly following changes and arriving at the correct output information signal with a minimum of delay.

Another object of the invention is to provide a new and improved frequency meter which may readily be adapted for measuring high and low frequency signals.

Another object of the invention is to provide a new and improved frequency meter which may readily be adapted for various design and system requirements.

The above objects are achieved by providing a frequency meter comprising an information input terminal for receiving signals at a frequency to be determined, a reversible counting device, and a rate multiplier unit. The reversible counting device has a forward count input lead excited by signals from said input terminal, a reverse count input lead, and an output lead. The rate multiplier unit is connected with the output lead of the counting device for controlling its multiplying rate, and has an input line for receiving signals at a predetermined frequency, and an output line connected with the reverse count input lead of the counting device.

The above objects as well as may other objects will be apparent from the description of the invention when read in connection with the drawings, in which.

Figure 1:
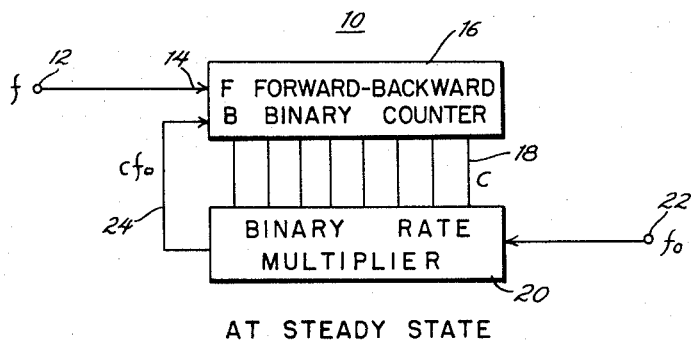
Figure 1 is a block diagram illustrating an embodiment of the invention.

Referring to Figure 1, which illustrated a frequency meter 10 embodying the invention the information input terminal 12 is adapted to receive pulse signals occurring sequentially at the frequency $f$ to be determined. The terminal 12 is connected to the forward input terminal 14 of a forward-backward binary counter 16. A binary counter 16 which may be utilized in the frequency meter 10 is fully described in connection with Figure 4 of the application for U.S. Letters Patent of Bernard M. Gordon and Robert P. Talambiras, Serial No. 523,798 and therefore will not be described in detail herein.

The plurality of output leads 18 of the binary counter 16 delivers an information signal in binary form corresponding to its count. These signals are simultaneously present on the lines 18. The signals delivered by the lines 18 change to correspondingly indicate the increase or decrease in the count of the counter 16.

The output signals from the lines 18 of the counter 16 are delivered to a binary rate multiplier 20. A binary rate multiplier of the type which may be used herein is described in an article entitled "Special Purpose Digital Data Processing Computers" by Bernard M. Gordon and R. N. Nicola appearing in the Proceedings of the Association for Computing Machinery, of May, 1952 and therefore will not be fully described herein.

In general the binary rate multiplier unit described in the above article has an input terminal 22 which receives actuating pulses or signals at a predetermined rate or frequency $f_0$. The multiplier unit also receives rate control information in binary form, and delivers signals at its output line 24 having a rate or frequency which is the product of the said input signals. The output is derived by buffing the signals from a plurality of output gates which are controlled by the rate control signals. The gates which are conductive deliver pulse signals derived from a binary cascade counter which is driven by the activating pulses at the input terminal 22.

Actuating pulse signals at a predetermined frequency $f_0$ are delivered to the multiplier unit 20 from an input terminal 22. These signals are time sequenced and result in the delivery of an output signal from the multiplier 20 over the line 24 which is connected with the backward input line of the binary counter 16.

In operation, the sequence of pulse signals delivered to the input terminal 12 are delivered to the binary counter 16 causing it to count forward at the frequency of their occurrence $(f)$. The count signal from the binary counter 16 is delivered to the binary rate multiplier 20 which produces a sequence of output signals occurring at a frequency which is the product of the count signal $C$ from the binary counter 16 and the actuating signal frequency $f_0$ which may be represented by $Cf_0$. These signals delivered to the backward count input count lead 24 of the binary counter 16 causes it to count in the backward direction. When the frequency of signals $f$ delivered to the forward count line 14 is equal to the frequency of signals $Cf_0$ delivered to the backward input line of the binary counter 16, the counter 16 will be in its steady state condition, delivering a steady state output signal $C$ in binary form.

Under these circumstances the steady state signal $C$ is proportional to the frequency of the signals delivered to the input terminal 12 which is to be determined by the frequency meter 10.

This may readily be evident from the steady state equations in which:

$$f = Cf_0$$
$$C = f/f_0 = kf \text{ where } k = 1/f_0$$

It is noted that the frequency meter 10 is of the closed loop or servo type which is actuated to deliver an output signal C in binary form over the output lines 18 corresponding to the frequency $f$ of the signals delivered at the terminal 12. Thus when the frequency $f$ of signals delivered at the terminal 12 changes, the count of the counter 16 is caused to change until it again assumes its steady state, at which time its output binary signal C corresponds and is proportional to the frequency $f$ of the input signal at terminal 12.

In cases where the frequency at the input terminal 12 changes at a rate slow enough so that the count of the binary counter 16 follows it, the output lines 18 continuously deliver output information C which accurately represents the input frequency $f$ during its change.

In cases where the frequency changes quickly so that the count of the binary counter 16 is caused to lag behind, the count C of the counter 16 is being corrected immediately upon such frequency shift and assumes the proper value after a delay depending upon the degree of change in the input frequency $f$ at the terminal 12.

Figure 2:
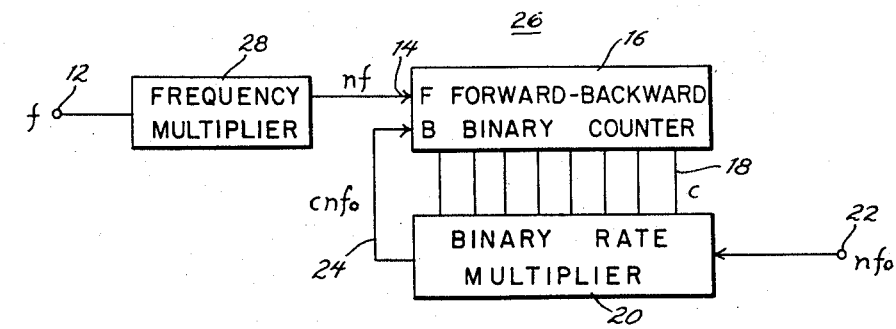
Figure 2 is a block diagram illustrating a modified form of the invention.

Refer now to Figure 2 which discloses a frequency meter 26 which is adapted for more quickly delivering the correct output information when an unknown frequency $f$ is delivered to its input terminal 12 and more accurately follows rapid changes which may take place in the frequency $f$ of the signal delivered to the input terminal 12.

The device 26 is substantially similar to the device 10 except that it is provided with a frequency multiplier 28 inserted between the input terminal 12 and the forward input lead 14 of the binary counter 16.

Since the frequency multiplier 28 multiplies and increases the frequency delivered to the input terminal by a factor of $n$ the frequency delivered from its output to the forward input terminal 14 of the binary counter 16 may be represented by $nf$.

As previously, the ouput information signal or count C is delivered from the binary counter 16 to the binary rate multiplier 20. In the instant case, the pulse rate of the predetermined frequency delivered to the input terminal 22 for activating the multiplier 20 is also increased by the factor of $n$ so that its frequency is $nf_0$. This results in a train of output signals over the line 24 from the multiplier 20 which is increased by a factor of $n$ and is represented by $Cnf_0$.

In operation, the device 26 assumes a steady state count C of its binary counter 16, when the frequencies delivered to its forward and backward input terminals are equal. Therefore, under steady state conditions: $nf = Cnf_0$, and $C = f/f_0 = kf$, where $k = 1/f_0$.

Thus, in this case, the count C delivered in binary form at the output leads 18 of the binary counter 16 is proportional to the frequency of the input signal 12. This result is identical to that achieved by the device 10 illustrated in Figure 1.

By multiplying the input signal delivered to the input terminal 12 by a factor of $n$ and increasing the rate of activating signals delivered to the multiplier 20 by this factor, the binary counter 16 receives forward and backward counting pulses at a greater rate allowing it to establish an equilibrium condition more quickly. This allows the device 26 to assume the proper output value C on its lines 18 more quickly after a signal is delivered to the input terminal 12, and also allows the counter 16 to follow more rapid changes and shifts in the frequency of the signal delivered to the terminal 12.

Although the invention is illustrated by two embodiments, it will be obvious to those skilled in the art that many modifications and adaptations of the invention may be made without substantially departing from the spirit thereof.

What is claimed is:

1. A counting apparatus comprising a source of a variable frequency signal, an information input terminal energized by said variable frequency signal; a reversible counting device having a first input lead excited by signals from said input terminal, a second input lead, and an output; a source of a fixed frequency signal, and a rate multiplier unit controlled by signals from the output of said counting device and having an input line receiving activating signals from said fixed frequency signal source, and an output line exciting the second input lead of said counting device.

2. A frequency meter comprising a source of a variable frequency signal, an information input terminal receiving said variable frequency signal at a frequency to be determined; a reversible counting device having a forward count input lead excited by signals from said input terminal, a reverse count input lead, and an output lead; a source of a fixed frequency signal, and a rate multiplier unit connected with the output lead of said counting device for controlling its rate, and having an input line receiving said fixed frequency signal at a predetermined frequency, and an output line connected with the reverse count input lead of said counting device.

3. A frequency meter comprising a source of a variable frequency signal, an information input terminal receiving said variable frequency signal at a frequency to be determined; a reversible binary counting device having a forward count input lead excited by signals from said input terminal, a backward count input lead, and a plurality of output leads; a source of a fixed frequency signal, and a binary rate multiplier unit connected with the output leads of said counting device controlling its rate, and having an input line for receiving said fixed frequency signal at a predetermined frequency, and an output line delivering discrete pulses connected with the backward count input lead of said counting device.

4. A frequency meter comprising a source of pulses occurring at a variable frequency, an information input terminal receiving said variable frequency pulse signals at a frequency ($f$) to be determined; a forward-backward binary counting device having a forward count input lead connected with said input terminal, a backward count input lead, and a plurality of output leads delivering an output count signal (C); a source of pulses occurring at a fixed frequency, and a binary rate multiplier unit connected with the output leads of said counting device for controlling its rate and having an input line receiving said fixed frequency pulse signals at a predetermined frequency ($f_0$), and an output line delivering a signal with a product frequency ($Cf_0$) to the backward count input lead of said counting device, so that at the steady state condition of said counting device its count (C) is proportional to the frequency of the pulse signal received at said input terminal.

5. A frequency meter producing an output information signal in binary form comprising a source of sequential pulse signals occurring at a variable frequency, a reversible binary counter having a forward input lead receiving said variable frequency sequential pulse signals at a frequency ($f$) to be determined, a backward input lead, and a plurality of output leads simultaneously delivering a count signal (C) in binary form; a source of sequential pulse signals occurring at a fixed frequency, and a binary rate multiplier connected with the output leads of said counting device for controlling its rate and having an input line receiving said fixed frequency sequential pulse signals at a predetermined frequency ($f_0$), and an output line delivering sequential pulse signals with a product frequency ($Cf_0$) to the backward count input lead of said counting device, so that at the steady state condition of said counting device its binary count signal (C) is proportional to the frequency of the sequential pulse signals received at said input terminal.

6. A counting apparatus comprising a source of a variable frequency signal, an information input terminal energized by said fixed frequency signal; a frequency multiplying device excited by signals from said terminal; a reversible counting device having a first input lead excited by signals from said multiplying device, a second input lead, and an output; a source of a fixed frequency signal, and a rate multiplier unit controlled by signals from the output of said counting device and having an input line receiving said fixed frequency signal, and an output line exciting the second input terminal of said counting device.

7. A frequency meter comprising a source of a variable frequency signal, an information input terminal receiving said variable frequency signal at a frequency to be determined; a frequency multiplying device excited by said variable frequency signal from said input terminal; a reversible counting device having a first count input lead excited by output signals from said multiplying device, a reverse count input lead, and an output lead; a source of a fixed frequency signal, and a rate multiplier unit connected with the output leads of said counting device for controlling its rate, and having an input line receiving said fixed frequency signal at a predetermined frequency, and an output line connected with the reverse count input lead of said counting device.

8. A frequency meter producing an output information signal comprising a source of pulse signals at a variable frequency $(f)$ to be determined; a frequency multiplying device excited by said variable frequency pulse signals and delivering discrete output signals; a reversible binary count input lead excited by output signal from said multiplying device, a backward count input lead, and a plurality of output leads delivering an output count signal (C); a source of fixed frequency pulse signals, and a binary rate multiplier unit connected with the output leads of said counting device for controlling its rate and having an input line receiving said fixed frequency pulse signals at a predetermined frequency $(f_0)$, and an output line delivering a signal with a product frequency $(Cf_0)$ to the backward count input lead of said counting device, so that at the steady state condition of said counting device its count (C) is proportional to the frequency of said variable frequency pulse signals.

9. A frequency meter comprising a source of variable frequency pulse signals, an information input terminal receiving said variable frequency pulse signals at a frequency $(f)$ to be determined; a frequency multiplying device having an input lead connected with said input terminal and an output lead delivering pulse signals at an increased frequency $(nf)$; a forward-backward binary counting device having a forward count input lead connected with said input terminal, a backward count input lead, and a plurality of output lead delivering an output count signal (C); a source of fixed frequency pulse signals, and a binary rate multiplier unit connected with the output leads of said counting device for controlling its rate and having an input line receiving said fixed frequency pulse signals at a predetermined frequency $(nf_0)$, and an output line delivering a product signal $(nCf_0)$ to the backward count input lead of said counting device, so that at the steady state condition of said counting device its count (C) is proportional to the frequency of the pulse signal received at said input terminal.

10. A frequency meter producing an output information signal in binary form comprising a source of variable frequency sequential pulse signals, a reversible binary counter having a forward input lead receiving said variable frequency sequential pulse signals at a frequency $(f)$ to be determined, a backward input lead, and a plurality of output leads simultaneously delivering a count signal (C) in binary form; a frequency multiplying device having an input lead connected with said input terminal and an output lead delivering sequential pulse signals at an increased frequency $(nf)$; and a reversible binary counter having a forward input lead adapted to receive sequential pulse signals at a frequency $(nf)$ to be determined, a backward input lead, and a plurality of output leads simultaneously delivering a count signal (C) in binary form; a source of fixed frequency sequential pulse signals, a binary rate multiplier connected with the output leads of said counting device for controlling its rate and having an input line receiving said fixed frequency sequential pulse signals at a predetermined frequency $(nf_0)$, and an output line delivering sequential pulse signals with a product frequency $(nCf_0)$ to the backward count input lead of said counting device, so that at the steady state condition of said counting device its binary count signal (C) is proportional to the frequency of the sequential pulse signals received at said input terminal.

References Cited in the file of this patent

UNITED STATES PATENTS

| | | |
|---|---|---|
| 2,429,427 | Rieber | Oct. 21, 1947 |
| 2,476,840 | Colander | July 19, 1949 |
| 2,568,724 | Earp | Sept. 25, 1951 |
| 2,715,678 | Barney | Aug. 16, 1955 |

OTHER REFERENCES

Publication: Transaction of the I.R.E. Professional Group on Electronic Computer EC 3 #1, March 1954, pp. 17-20.